(12) United States Patent
Woodson

(10) Patent No.: US 7,578,495 B2
(45) Date of Patent: Aug. 25, 2009

(54) LEAK PREVENTION SYSTEM

(75) Inventor: Damon Eric Woodson, Macon, GA (US)

(73) Assignee: The Southern Company, Atlanta, GA (US)

( * ) Notice: Subject to any disclaimer, the term of this patent is extended or adjusted under 35 U.S.C. 154(b) by 584 days.

(21) Appl. No.: 11/523,385

(22) Filed: Sep. 19, 2006

(65) Prior Publication Data

US 2007/0063161 A1 Mar. 22, 2007

Related U.S. Application Data

(60) Provisional application No. 60/718,803, filed on Sep. 20, 2005.

(51) Int. Cl.
*F16K 3/16* (2006.01)
(52) U.S. Cl. .................. 251/214; 277/317; 277/321; 277/500; 277/510; 74/582
(58) Field of Classification Search ............. 137/68.18, 137/524, 557, 559; 251/214; 277/317, 321, 277/500, 510; 242/910, 912; 73/40; 411/1, 411/6, 119, 120, 121, 315, 539; 52/702; 74/582

See application file for complete search history.

(56) References Cited

U.S. PATENT DOCUMENTS

| 3,787,060 | A | * | 1/1974 | Astill | 277/516 |
|---|---|---|---|---|---|
| 4,497,493 | A | | 2/1985 | Sall et al. | |
| 5,192,049 | A | * | 3/1993 | Ridge | 277/523 |
| 5,290,010 | A | * | 3/1994 | Ridge | 277/522 |
| RE34,923 | E | | 5/1995 | Ruesch | |
| 5,456,447 | A | * | 10/1995 | Reynolds | 251/214 |
| 5,660,417 | A | | 8/1997 | Reeves | |
| 5,927,685 | A | * | 7/1999 | Gosling | 251/214 |
| 6,168,161 | B1 | | 1/2001 | Majcen | |
| 6,382,633 | B1 | * | 5/2002 | Hashiguchi et al. | 277/511 |
| 2004/0256589 | A1 | * | 12/2004 | Laurent et al. | 251/214 |
| 2005/0077686 | A1 | * | 4/2005 | Yamauchi et al. | 277/510 |
| 2007/0278441 | A1 | * | 12/2007 | Leimer | 251/214 |

* cited by examiner

*Primary Examiner*—John Rivell
*Assistant Examiner*—Jeremy S Baskin
(74) *Attorney, Agent, or Firm*—Seyed Kaveh E. Rashidi-Yazd, Esq.; Troutman Sanders LLP

(57) ABSTRACT

The present invention is a leak prevention system that monitors and detects loosening of a valve. The leak prevention system includes a biasing member, a tightening member, and a pulling member. The biasing member has a first end and a second end, the first end being in communication with the tightening assembly, while the second end being in communication with the pulling assembly. The tightening assembly is carried by the valve, is adapted to tighten the packing nut should packing from the valve loosen. The pulling assembly is adapted to pull the tightening assembly via the biasing member after packing wears away, such that the wearing away loosens the tightening assembly and the constant force of the biasing member, supported by the pulling assembly, causes the tightening assembly to move. After packing has worn away, a visual indication can indicate to an operator that the valve may soon leak.

15 Claims, 4 Drawing Sheets

LEAK PREVENTION SYSTEM

CROSS REFERENCE TO RELATED APPLICATION

This application claims priority of U.S. Provisional Patent Application No. 60/718,803, filed 20 Sep. 2005, the entire contents of which is hereby incorporated by reference.

BACKGROUND

1. Field of the Invention

The present invention relates to valves and, more particularly, to a device and method for detecting and monitoring media leakage from a valve.

2. Description of Related Art

Valves used in applications involving media flow, i.e., fluid and/or gas flow, are well known in the art. Valves are used to restrict and/or isolate media flow, often through a pipeline. Typically, a valve includes a stem that enters the body of the pipeline which when connected to a disc can stop media flow. Based on positioning of a disc, media flow can start, stop, or be regulated. Oftentimes, the valve is sealed with a packing material around the stem to prevent leakage of media. Preferably, packing is a malleable compound adapted to seal a valve stem when tightened. The characteristics of the packing must be both strong and hard enough to hold the pressure of media in the valve, but yet soft enough to be compressed into shape.

While valves are helpful in regulating media flow in a pipe, they also can be destructive if allowed to degrade to a condition where external leakage can occur. As the stem of the valve is stroked, or moved, the packing can slowly wear away. This wearing away or other degradation can create gaps in the packing, which can cause the valve to become loose, losing the ability to contain pressurized media, and thus media within the pipe can escape. The result of such escaping media includes the possible release of valuable material and can, in many circumstances, be extremely dangerous. For example, a pipeline can contain a toxic flow, wherein leakage could result in disastrous consequences, including possible fatalities.

Some devices and methods are available to help detect an existing leak in the valve. For instance, U.S. Pat. No. 6,168,161 to Majcen discloses a rotary valve shaft seal. A seal having spacers is positioned between a packing and a valve body, wherein the spacers enable adjustment of the packing. The spacers have a predetermined thickness, which permit the maximum tightening of the packing. Furthermore, the spacers permit the exertion of the maximum pressure on the packing fasteners. Majcen uses linear motion to adjust the device. While Majcen indicates that the packing is worn, it fails to indicate when the packing wears. The disastrous consequences of a leaking valve are still possible even with Majcen.

U.S. Pat. No. RE34923 to Ruesch describes a valve stem seal leak protection and detection apparatus. This invention discloses an indicator that provides information relating to actual leakage of media. In order for the indicator to operate, pressure pushes through the packing. Thus, there is a leak. Unfortunately, Ruesch requires an actual leak to occur before the leak can be identified.

Currently, leaks in and around a packing of valves can and do go undetected. What is needed, therefore, is a leak prevention device that can indicate that a leak is forthcoming, rather than a leak has occurred. Additionally, the device would be beneficial if it can be directly attached to a valve.

SUMMARY

The present invention is adapted to detect and monitor a potential leakage in proximity of the valve before an actual leakage occurs. The present invention is a leak prevention system that is adapted to indicate evidence of the loosening of a valve. The leak prevention system includes a biasing member, a tightening member, and a pulling member. The biasing member has a first end and a second end. The first end of the biasing member is in communication with the tightening assembly, while the second end of the biasing member is in communication with the pulling assembly. The tightening assembly is carried by the valve.

The tightening assembly is preferably carried by a packing nut, and is adapted to tighten the packing nut should packing from the valve loosen. The pulling assembly is adapted to pull the tightening assembly via the biasing member after packing wears away, such that the wearing away loosens the tightening assembly and the constant force of the biasing member, supported by the pulling assembly, causes the tightening assembly to move. When the packing has worn away, a visual indication of such loosening will result, indicating to an operator that the valve may soon leak.

The leak prevention system also includes a method of indicating a loosening of a nut or bolt. In an exemplary embodiment, the method includes providing a tightening assembly carried by a nut on a valve adaptable to tighten the nut on the valve; biasing a bias member between the tightening assembly and a pulling assembly, wherein the puling assembly is adapted to pull on the tightening assembly; and indicating movement of the tightening assembly based on a pull by the pulling assembly.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
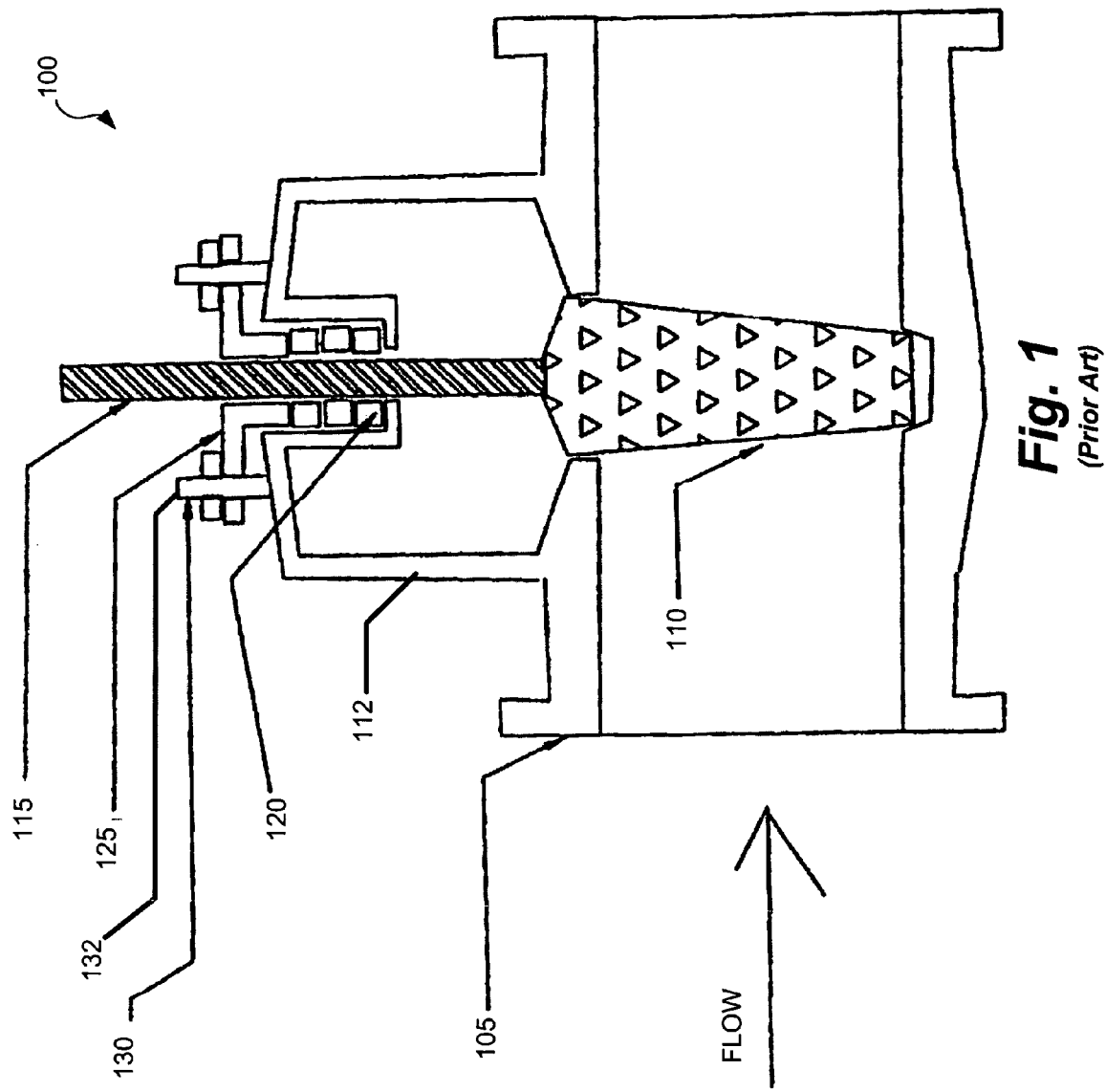
FIG. 1 depicts a cross-sectional view of a conventional valve body.

To facilitate an understanding of the principles and features of the invention, it is explained hereinafter with reference to its implementation in an illustrative embodiment. In particular, the invention is described in the context of being a leak prevention system for detecting and monitoring media leakage through wear of a valve.

The invention, however, is not limited to its use as a leak prevention system. Rather, the invention can be used when a device for maintaining a tight bolt or nut is desired, or as is necessary. Thus, the device described hereinafter as a leak prevention system can also find utility as a device for other applications, beyond that of a valve in a pipeline.

Additionally, the material described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Referring now to the figures, wherein like reference numerals represent like parts throughout the view, the present leak prevention system will be described in detail.

FIG. 1 depicts a cross-sectional view of a conventional valve 100 adaptable to be positioned in a flow. Conventional valves include a valve body 105, a valve plug 110, a stem 115, packing 120, a packing nut 125, and a connection member 130.

The conventional valve 100 can include the elongated longitudinal axis valve body 105 having a substantially circular cross-section. The valve body 105 can be positioned in communication with a pipeline, wherein permitting media to flow therethrough. In general, the valve body 105 can carry media, i.e., fluid or gas, such as natural gas, water, oil, toxic chemicals, and the like therethrough. The illustrated arrow depicts the direction of media flow.

The valve plug or disc 110 is a device that can regulate flow in the valve body 105. As depicted in FIG. 1, the flow can be stopped because the plug 110 is fully positioned in the valve body 105 prohibiting the flow of media. The plug 110 can be adapted to prohibit flow, by acting as a flow barrier. The plug 105 can comprise a myriad of shapes, including but not limited to a ball, globe, gate, and the like. The material of the plug 110 is preferably dependent on the media flowing through the valve body 105. For instance, if water is flowing through the valve body 105, it is preferred that the plug 110 is made of non-rusting material in a water environment The stem 115 is in communication with the plug 110 and can operate as a handle to control plug 110 movement. The stem 115, as depicted in FIG. 1, extends upwardly from the plug 110 through a bonnet 112. The stem 115 is adapted to enable the plug 110 to be positioned in one of three positions. A first position of the plug 110 is when the plug 110 prohibits media to flow in the valve body 105 this position depicted in FIG. 1. A second position of the plug 110 is when the plug 110 partially blocks media flow, i.e., regulating media flow, but is not completely out of the way of media flow. A third position of the plug 110 is when the plug 110 is housed in the bonnet 112 resulting in a preferably minimal to no flow disruption. The stem 115 can include a rotating or non-rotating design, wherein raising and/or lowering of the plug 110 is performed with a rotating or non-rotating stem 115.

As the stem 115 causes the plug 110 to enter the valve body 105 of the valve 100, the stem 115 should be sealed in some manner; otherwise media is likely to escape the bonnet 112. In an exemplary embodiment, the valve body 105 is sealed with the packing 120. Indeed, the packing 120 can preferably surround the stem 115. The packing 120 should be strong enough and hard enough to hold the pressure in the valve body, but yet soft enough to be compressed into shape and seal around the stem 115. The packing 120 is adapted to prevent leakage of media from the valve body 105.

Figure 2:
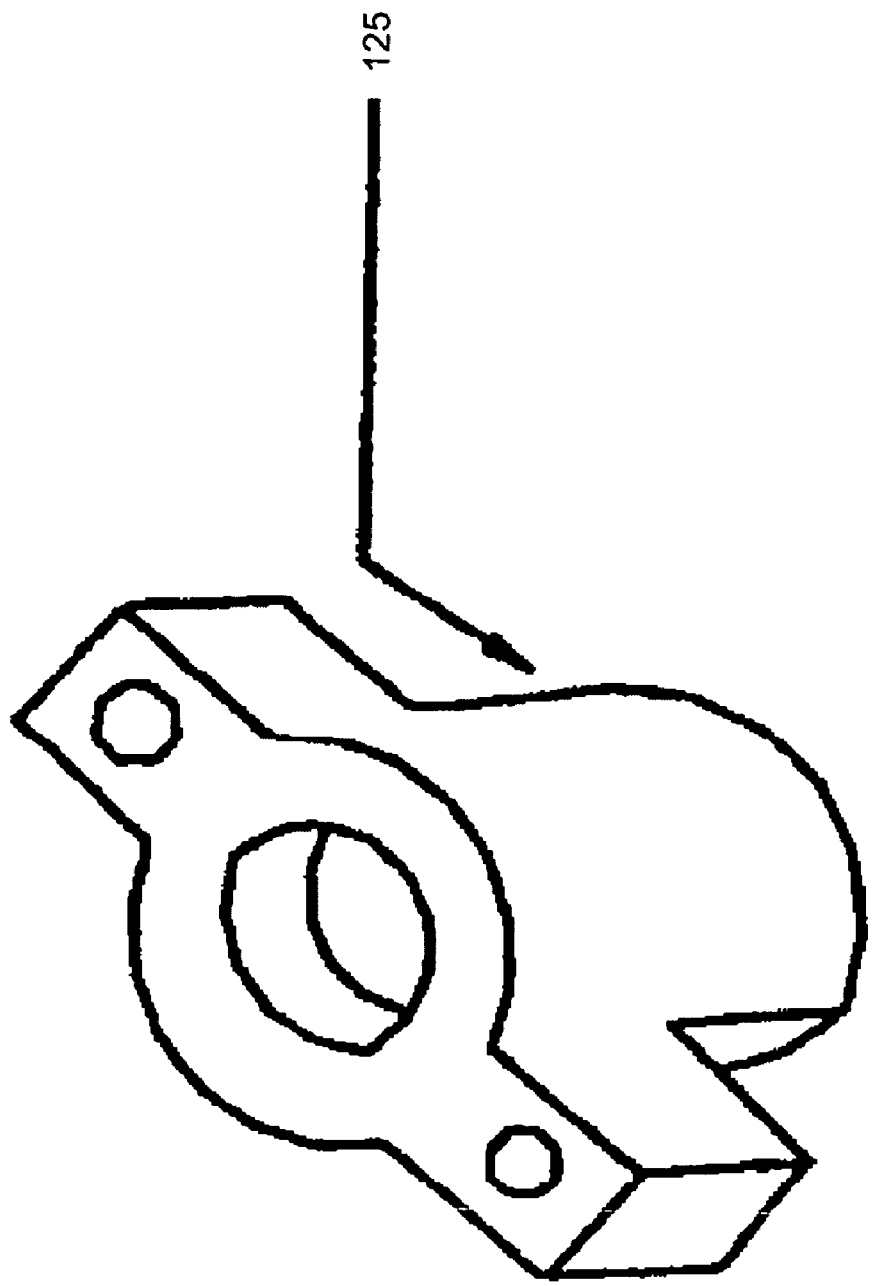
FIG. 2 depicts a perspective view of a conventional valve packing nut.

The packing 120 can be in communication with the packing nut 125. The packing nut 125 is often a metal plunger that enables the packing 120 to be tightened and remain in position. Generally, the packing nut 125 is attached to the valve body 105 by the connection member or securing member 130, which can be at least two bolts 132. FIG. 2 illustrates a perspective view of a conventional valve packing nut 125.

Referring back to FIG. 1, the packing nut 125 can be positionable over the packing 120 of the valve body 105. Once the valve stem 115 is sealed to the valve body 105, via the packing 120, the valve body 105 is sealed and media should not be able to leak out of the valve body 105. In essence, the packing nut 125 and packing 120 can form a pressure boundary, which occurs when pressure is holding media in a container. Unfortunately, after some wear and tear, stroke, or use of the valve stem 115, the packing 120 will wear. As a result, leaking is now possible through a hole in the packing 120 where the valve stem 115 penetrates the valve body 105 (i.e., access to the bonnet 112).

The wear on the packing 120 can result in the leakage of media, as the wear on the packing 120 often goes undetected. The leaks are caused when the clamping forces provided by the packing nut 125 are reduced due to the wear of the packing 120.

Having now described the conventional valve for which the leak prevention system can be in communication, the leak prevention system for detecting potential leakage of media will now be described in detail.

Figure 3:
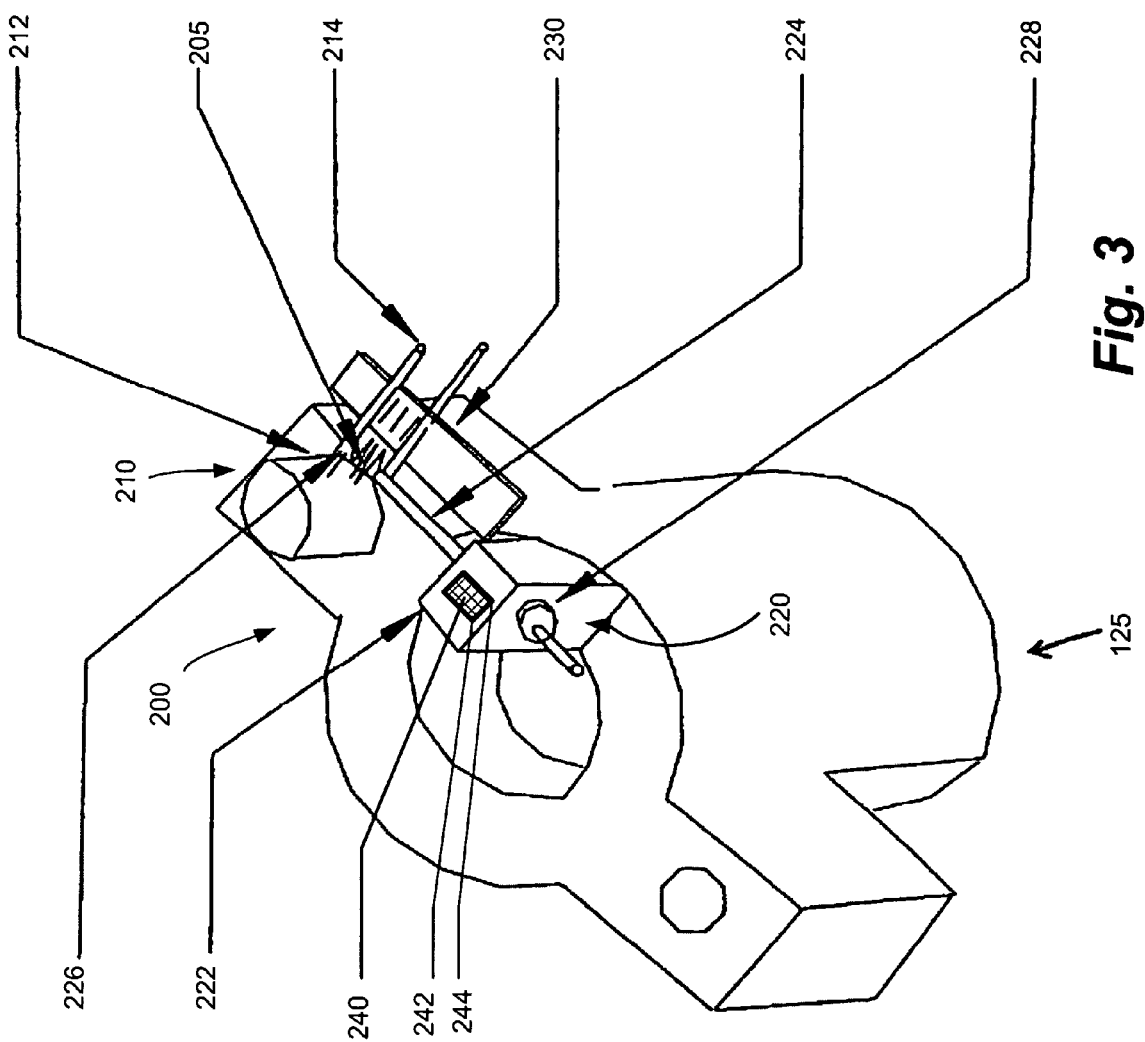
FIG. 3 depicts a perspective view of a leak prevention system, in accordance with an exemplary embodiment of the present invention.
Figure 4:
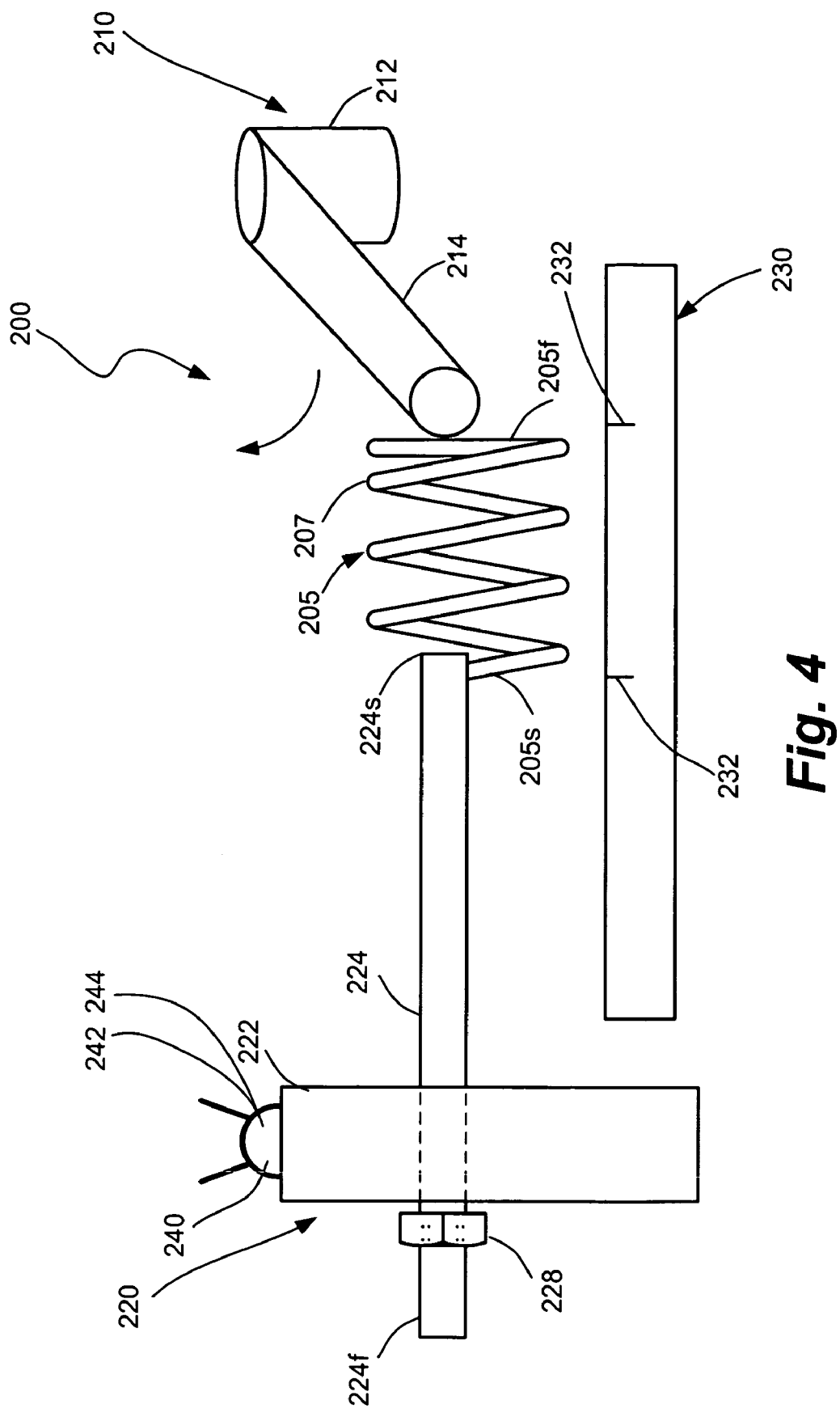
FIG. 4 depicts a side, perspective view of the leak prevention system, in accordance with an exemplary embodiment of the present invention.

FIG. 3 illustrates a perspective view of a leak prevention system, in accordance with an exemplary embodiment of the present invention. FIG. 4 depicts a side, perspective view of the leak prevention system, in accordance with an exemplary embodiment of the present invention. The leak prevention system 200 is adapted to detect and monitor the loosening of a bolt and/or nut. In an exemplary embodiment, the leak prevention system 200 can detect and monitor wearing in the packing 120 indicating loosening about the stem 115, often a loosening of the packing nut 125, providing an indication of potential leaking of the valve 100. The leak prevention system 200 can include a bias member 205, and a tightening assembly 210 in communication with a pulling assembly 220 via the bias member 205. The leak prevention system 200 can be positioned on the packing nut 125 or other device that can indicate a wear and loosening of the valve, in an attempt to prevent leakage.

The bias member 205 is adapted to connect the tightening assembly 210 to the pulling assembly 220. In a preferred embodiment, the bias member 205 is a spring mechanism 207. The bias member 205 can be set to a predetermined tension to enable the pulling assembly 220 to pull the tightening assembly 210 a predetermined amount. The bias member 205 includes a first end 205$f$ and a second end 205$s$. In an exemplary embodiment, the first end 205$f$ of the bias member 205 is in communication with the tightening assembly 210. The second end 205$s$ of the bias member 205 can be in communication with the pulling assembly 220.

The tightening assembly 210 can include a socket apparatus 212 and an elongated arm 214, combined to tighten a nut or bolt on the valve 100. By tightening the nut or bolt, it can be monitored that the nut or bolt has loosened, often because of a loss of packing 120 from the stem 115 in a valve 100. The socket apparatus 212 can cooperatively fit over the nut or bolt of the valve 100. The elongated arm 214 can be in communication with the socket apparatus 212. Preferably, the elongated arm 214 extends outwardly in a selected direction. The socket assembly 212, by being positioned over the nut or bolt, can be a support for the arm 214. On the arm 214, at a predetermined distance from the socket apparatus 212, the first end 205$f$ of the bias member 205 can be positioned.

The pulling assembly 220 can include a support 222 and a rod 224. The support 222 carries the pulling assembly 220 by placing the pulling assembly 220 in position to pull the tightening assembly 210 via the bias member 205. In one embodiment, the support 222 can define a hole 227 therethrough for receiving, along with a nut 228, and securing the rod 224. The rod 224, however, can be carried by the support 222 by other means, such as welding, adhesives, and the like. The rod 224 extends from the support 224 generally in a direction towards the arm 214 of the tightening assembly 210. The rod 224 includes a first end 224f and a second end 224s. The first end 224f of the rod 224 can be in communication with the support 222, while the second end 224s of the rod 224 can be in communication with the second end 205s of the bias member 205.

As described, wear on the packing 120 can cause leakage from the valve 100, because the wear on the packing 120 often goes undetected. The leak prevention system 200 includes a method of detecting wear on the packing 120. Typically, the bolt 132 of the valve 100 connects the packing nut 125 to the valve body 105. The bolt 132 should be tightened to attach it and provide the necessary force for sealing the valve body 105. Tightening the bolt 132 results in torque, or force at a distance, being applied to the bolt 132. Depending on the distance from the bolt 132, an inch-pound or a foot-pound torque is created on the bolt 132.

Because a force can not be constantly applied to the bolt 132 to keep the bolt 132 as tight as possible (wear of packing 120 reduces force), a method of evaluating tightness of the bolt 132 necessary. The leak prevention system 200 can accomplish this.

One method of tightening the bolt 132 is to use the spring mechanism 207 in conjunction with the socket apparatus 212 and rod 224. The spring mechanism 207 can be adapted to store energy, which can be used to re-tighten a loose bolt 132. The force (F) of many springs is calculated by multiplying the spring constant (k) times the distance (d) the spring moves, i.e., F=k*d. Based on the size, both the width and length, of the spring mechanism 207 used in a leak protection system 200, a predetermined force can be created that matches the force needed to seal the valve stem 115. Thus, a small movement of the tightening assembly 210 can amplify the force on the spring mechanism 207 and thus move the bolt 132, as necessary.

The leak prevention system 200 can use a tightening nut 228 on the pulling assembly 220 to adjust the tension on the spring mechanism 207, wherein tightening the socket apparatus 212 via the rod 224. That is, the rod 224 can be adapted to apply a torque on the socket apparatus 212 by the tightening nut 228 and the spring mechanism 207. The arm 214 can be bent elastically by the force applied by the spring mechanism 207, and the movement can often be seen by the human eye. The length of this bend is proportional to the force applied by the nut 228, and can be used to determine if proper torque is on the socket apparatus 212. Further, the leak prevention system 200 can include a scale mechanism 230 to visually indicate of the amount of torque on the rod 224, indicating the movement of arm 214.

The leak prevention system 200 can include the socket apparatus 212. The socket apparatus 212 can be made of various materials, including, for example, steel, bronze, brass, and the like. In a preferred embodiment, the material of the socket apparatus 212 can be the same material as the bolt 132. In addition, the socket apparatus 212 can be corrosion treated, i.e., plated with chrome. Moreover, the socket apparatus 212 can be made of very strong hardened alloy steel.

The diameter of the socket apparatus 212 can, preferably, be approximately the head of the bolt 132 existing on the packing nut 120. While the size of the nut 228 can vary among manufacturers, the range of the diameter of the socket apparatus 212 can be, preferably, between 1/16 inches to 3 inches.

The height of the socket apparatus 212 can approximately match the height of the nut on the bolt 132. Preferably, the height is enough so that the socket apparatus 212 and the rod 224 have at least approximately 15 degrees movement. Since valves vary in size, structure, and manufacturers, the height of the socket apparatus 212 should be approximately one and a half times the height of the nut on the bolt 132.

In an exemplary embodiment, the rod 224 can be composed of steel. The arm 214 can be made of a material that will not permanently bend, i.e., the arm 214 can bend slightly, but not bend plastically. The rod 224 can be made of carbon steel and threaded, i.e., threaded to attach to the spring mechanism 207. Alternately, the rod 224 can be smooth. Depending on the size of the valve 100, the rod 224 can vary in length. In an exemplary embodiment, however, the rod 224 has a length of approximately 1 to 4 inches. The rod 224 can have a length of 1 inch to 7 feet. Depending on the size of the valve body 105, the rod 224 can have a taper on it.

Still referring to FIG. 3, the socket apparatus 212 can be carried by the bolt 132 of the packing nut 125. Atop the socket apparatus 212, located at a 90 degree angle with respect to the packing nut 125, is the arm 214.

As for the spring mechanism 207, it is preferably made out of a metal. Indeed, the spring mechanism 207 can be made of spring steel, which is a strong steel. The spring mechanism 207 can typically be at least 1 inch in length. The spring mechanism 207, however, can be several inches long, in another exemplary embodiment. The spring mechanism 207 can also be a coil spring. The spring mechanism 207 is adapted to connect the arm 214 and the rod 224. The spring mechanism 207 can provide enough force such that the arm 214 can rotate the socket apparatus 212, thereby tightening the bolt 132.

The force created by moving the socket apparatus 212 with the spring mechanism 207 is a constant force. If the packing 120 should loosen, the bolt 132 can collapse to where the packing 120 wore away. Thus, the bolt 132 can loosen and the socket apparatus 212 can tighten, because the spring mechanism 207 is adapted to pull the bolt 132 via the socket apparatus 212. As a result of the tightening of the bolt 132, the length of the spring mechanism 207 can change. The length shortens (i.e., compresses) when the force to seal the valve body 105 is no longer present due to wear of the packing 120. In an exemplary embodiment, one can view the movement with their own eyes. When the movement in the spring mechanism 207 occurs, it alerts the user that maintenance is required on the packing nut 120, i.e., the bolt 132 must be tightened so the valve body 105 does not leak.

The leak prevention system 200 enables visual monitoring without actually having to touch the device 200 to see if the amount of torque on the bolt 132 is correct. This visual monitoring is accomplished with the scale mechanism 230.

The leak prevention system 200 can be positioned on the valve 100 after the bolt 132 is properly torqued. The bolt 132 is properly torqued by sealing the valve stem 115. In order to seal the valve stem 105, a predetermined force must be applied. The equation [(Packing Outside Diameter (inches)−Packing Inside Diameter (inches))*(System Pressure (lbt/sqin))*(Empirically Determined Load Factor (between 1 and 2))/(Number of Bolts (typically 2))] provides the force needed to seal the packing 120.

The force is transmitted by a torque, or the amount of tightening of the bolts 132 of the packing nut 120. The equation [(Force From Above (lbf))*(Fiction Factor of Threads)*

(Diameter of Packing Nut Bolts (inches))] provides the torque in inch-pound units that can seal the stem 115.

As described, the leak prevention system 200 is positioned upon the valve body 105 after the bolt 132 is properly torqued. The rod 224 of the pulling assembly 220 can generate a torque on the bolt 132 by causing the spring mechanism 207 to pull the socket mechanism 207. The combination of the rod 224 and the spring mechanism 207 together act like a socket wrench adapted to tighten the bolt 132. Together they can generate a torque on the bolt 132, which by moving can indicate the amount of torque.

This force can cause the spring apparatus 212 that is attached to the rod 224 to move and, therefore, elastically bend the arm 214. The movement of the arm 214 can be visible on the scale mechanism 230. The force equation is [K (the spring constant)*(distance spring is stretched)]. The spring mechanism 207 shall be sized so that the arm 214 can move to a predetermined mark on the scale mechanism 230. Preset marks 232 can be positioned on the scale mechanism 230 to indicate that there is sufficient torque to seal the valve stem 115. Each valve stem 115 can have to have a specific spring for the torque required.

Clearly, as the packing 120 wears, the torque shall decrease. Thus, the spring mechanism 207 can move the arm 214 from the original preset mark. The movement can be a small reduction in torque, and can be set to move before the torque is so low that the valve stem 115 leaks. An operator can view the arm 214 at the preset to see if the arm 214 moved by comparing its original preset position on the scale 230 to its present position on the scale 230. If the arm 214 moved, the operator can then contact a mechanic to come and re-torque the bolts 132, wherein identifying potential leakage before actual preventing leakage occurs. The leak prevention system 200 can then be set to back to the preset mark, and the process can be repeated as deemed necessary.

In another embodiment, the leak prevention system 200 can be adapted to communicate a shift in the tightening assembly 210, a loss of biasing by the bias member 205, or other changes and/or faults in the leak prevention system 200. As a result, the leak prevention system 200 can include a communication device 240, which is adapted to communicate change in status of the leak prevention system 200.

In one embodiment, the leak prevention system 200 can include a transmitter 242 in the communication device 240 to remotely transmit different events that occur at the leak prevention system 200. For example, the transmitter 242 can transmit movement of the tightening assembly 210, a change in force on the bias member 205, temperature changes in/around the valve 100, and the like. The communication device 240 can also include a receiver 244 for receiving signals. The signals received by the receiver 244 of the communication device 240 can cause the leak prevention system 200 to run a test on itself, and/or inform a remote operator that the leak prevention system 200 is operating properly. A purpose of the communication device 240 is to quickly and remotely transmit and/or receive changes in/around the leak prevention system. In short, the communication device 240 can add further safety characteristics to the leak prevention system 200.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A leak prevention system carried by a securing member to indicate the loosening of the securing member, the leak prevention system comprising:
   a bias member having a first end and a second end;
   a tightening assembly carried by the securing member adapted to tighten the securing member, the tightening assembly in communication with the first end of the bias member, wherein the bias member constantly generates a force on the tightening assembly; and
   a pulling assembly in communication with the second end of the bias member for supporting the bias member,
   wherein loosening of the securing member causes the pulling assembly to pull the tightening assembly via the bias member,
   wherein providing an indication of the loosening of the securing member.

2. The leak prevention system according to claim 1, wherein the tightening assembly includes:
   a socket apparatus carried by the securing member; and
   an arm carried by the socket apparatus, the arm extending outwardly from the socket apparatus, and the arm being adapted to tighten the socket apparatus on the securing assembly.

3. The leak prevention system according to claim 2, wherein after the pulling assembly pulls the tightening assembly an indication of the securing assembly is provided.

4. The leak prevention system according to claim 1, wherein the pulling assembly includes:
   a rod in communication with the second end of the bias member; and
   a support for carrying the rod.

5. The leak prevention system according to claim 1, wherein the movement of the tightening assembly indicates loosening of the securing member, and wherein the securing member is a bolt that is carried by a valve.

6. The leak prevention system according to claim 1, further including a scale mechanism for visually indicating the pulling assembly pulling the tightening assembly based on loosening of the securing member.

7. The leak prevention system according to claim 1, wherein the bias member is a spring mechanism.

8. The leak prevention system according to claim 1, further including a communication device for communicating with a remote location characteristics of the leak prevention system.

9. The leak prevention system according to claim 1, wherein the securing member is positioned on a packing gland of a valve, wherein the securing member loosens because packing around a stem of the valve is worn away, and wherein the leak prevention system provides a visual indication of the loosening.

10. A method of indicating a loosening of a securing member, the method comprising:
    positioning a socket apparatus upon the securing member, wherein the socket apparatus is in communication with an arm that extends outwardly from the socket apparatus;
    biasing a bias member between the arm and a support; and
    providing a visual indicator for displaying movement of the arm based on loosening of the securing member,
    wherein the arm is adapted to move based on pull by the bias member.

11. The method according to claim 10, further including indicating movement of the socket apparatus.

12. The method according to claim 10, further including tightening the securing member based on movement of the arm.

13. The method according to claim 10, wherein the bias member is a spring mechanism adapted to constantly provide a torque on the socket assembly via the arm.

14. The method according to claim 10, further including communicating to a remote location characteristics movement of the arm.

15. A leak prevention system for indicating changes in a securing member, the leak prevention system comprising:

a socket apparatus positionable atop the securing member;

an arm carried by the socket apparatus adapted to rotate the socket apparatus;

a spring mechanism having a first end connected to the arm, and a second arm connected to a support rod;

wherein the spring mechanism constantly generates a torque on the socket apparatus for rotating the socket apparatus as the securing member loosens.

* * * * *